Aug. 28, 1928.

W. E. HART 1,682,507

AUTOMOBILE BUMPER

Original Filed Oct. 7, 1927

INVENTOR
William E. Hart.

BY
Albu B. Dietrich
ATTORNEY

Patented Aug. 28, 1928.

1,682,507

UNITED STATES PATENT OFFICE.

WILLIAM E. HART, OF SAN JOSE, CALIFORNIA.

AUTOMOBILE BUMPER.

Original application filed October 7, 1927, Serial No. 224,662. Patent No. 1,670,963, dated May 22, 1928. Divided and this application filed March 24, 1928. Serial No. 264,381.

The invention generally relates to bumpers designed to protect vehicles against damage in collision, and more particularly to that type of such bumpers which provide for yieldably resisting obstructions when engaged in certain directions and to freely yield to obstructions engaged in other directions to prevent interlocking with said obstructions and breakage of said bumpers.

In its more detailed nature the invention resides in the provision of a novel bumper structure of the particular type stated which comprises a modification of the generic structure disclosed in my Patent No. 1,670,963, granted May 22, 1928, on an application filed October 7, 1927, Serial Number 224,662 of which parent application this present application forms a division.

With the above and other objects in view, the invention further resides in the novel details of construction, combination and arrangement of parts, all of which will be first fully described in the following detailed description, then be particularly pointed out in the appended claims, reference being had to the accompanying drawing, in which:—

Figure 1:
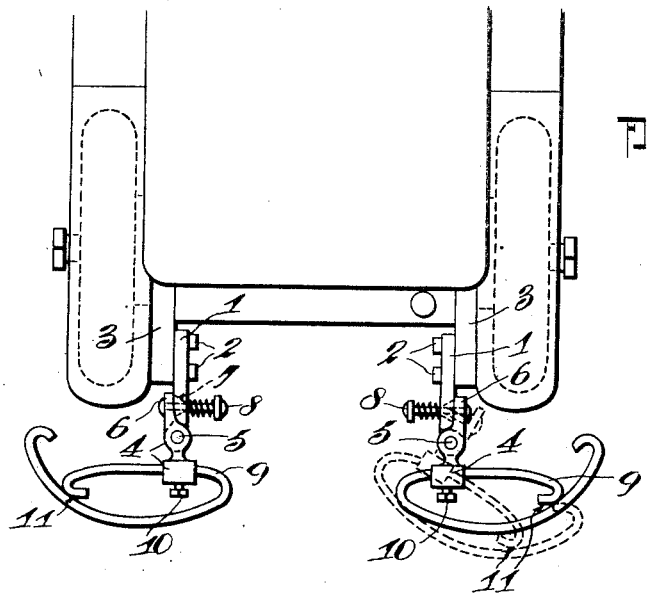
Figure 1 is a somewhat diagrammatic plan view of the rear end of an automobile equipped with my improved bumper structure.
Figure 2:
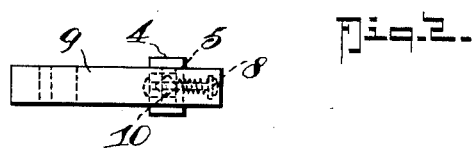
Figure 2 is a face view of the bumper.
Figure 3:
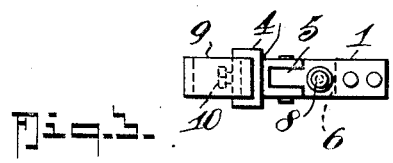
Figure 3 is an inside side elevation of the bumper.

In the practical development of the invention I provide a bracket 1 adapted to be secured as at 2 to the chassis hinge 3. The bracket 1 has a mounting head 4 hingedly mounted thereon as at 5 and equipped with an extension leg or stop 6 adapted to lie against the bracket when the parts are in the normal position illustrated in full lines in Figure 1 to prevent hinge movement of the head 4 in an outward direction. The extension leg or stop 6 and the bracket 1 are provided with registering apertures 7 to receive the spring bolt equipment 8 which serves to yieldably hold the hinged head 4 to the normal position illustrated in full lines in Figure 1 of the drawing.

In the head 4 a one-piece bumper member 9 is adjustably secured as at 10. It will be observed by reference to Figure 1 of the drawing that the bumper member is shaped substantially like the numeral 6, thus providing opposed reversely bowed resilient portions. One of said portions is extended laterally toward the outer side of the automobile while the other has an inturned loop portion to slidably engage the first mentioned bowed portion when the said bumper is active in taking up shocks due to collision. The bumper member is preferably shaped from a single length of resilient metal. The point at which the reversely bowed bumper members slidably engage is indicated at 11.

By providing the simple one-way hinge means of mounting the bumper the said bumper is relatively rigid against obstructions from the rear but yieldable when obstructed in other directions as indicated by dotted lines in the said Figure 1.

In the foregoing description I have disclosed a particularly simple and compact bumper structure which will very efficiently function to protect the vehicle on which it is mounted from impact due to collision met with in the usual manner but which is yieldable or free to move and overcome tendencies to interlock with obstructions engaged in unusual ways.

What I claim is:

1. In bumpers, a bumper member, and a mounting bracket therefor, said mounting bracket comprising a main bracket member and an auxiliary bracket member hinged thereto and having an abutment portion to engage the main bracket member and prevent hinge action in one direction, and spring connections adapted to yieldably hold the said main bracket member and auxiliary bracket member in engagement for the purpose specified.

2. In bumpers, a bumper member, and a mounting bracket therefor, said mounting bracket comprising a main bracket member and an auxiliary bracket member hinged thereto and having an abutment portion to engage the main bracket member and prevent hinge action in one direction, and spring connections adapted to yieldably hold the said main bracket member and auxiliary bracket member in engagement, said bumper member comprising reversely bowed opposed resilient lengths joined at one end and having slidable engagement one with the other at their other ends, and means to secure one of said resilient lengths upon the auxiliary bracket.

3. In bumpers, a bumper member, and a mounting bracket therefor, said mounting bracket comprising a main bracket member and an auxiliary bracket member hinged thereto and having an abutment portion to engage the main bracket member and prevent hinge action in one direction, spring connections adapted to yieldably hold the said main bracket member and auxiliary bracket member in engagement, said bumper comprising a single piece of resilient metal bent substantially in the shape of the numeral 6 forming an extended loop end and a looped-in end slidably engaging the portion from which said extended loop extends, and means to secure the bumper to move with the auxiliary bracket.

4. In bumpers, a bumper member, and a mounting bracket therefor, said mounting bracket comprising a main bracket and an auxiliary bracket hinged to said main bracket and forming a longitudinal extension thereof, said auxiliary bracket having a stop to lie along the main bracket and prevent hinge movement of said auxiliary bracket in an outward direction, and said main bracket and said stop having registering apertures, a bolt loosely mounted in the apertures and having end abutments, and a spring interposed between a bolt abutment and the stop to hold the auxiliary bracket in the normal position.

5. In bumpers, a bumper member, and a mounting bracket therefor, said mounting bracket comprising a main bracket and an auxiliary bracket hinged to said main bracket and forming a longitudinal extension thereof, said auxiliary bracket having a stop to lie along the main bracket and prevent hinge movement of said auxiliary bracket in an outward direction, and said main bracket and said stop having registering apertures, a bolt loosely mounted in the apertures and having end abutments, and a spring interposed between a bolt abutment and the stop to hold the auxiliary bracket in the normal position, said bumper comprising a single piece of resilient metal bent substantially in the shape of the numeral 6 forming an extended loop end and a looped-in end slidably engaging the portion from which said extended loop extends, and means to secure the bumper to move with the auxiliary bracket.

WILLIAM E. HART.